US012466491B2

(12) United States Patent
Song

(10) Patent No.: US 12,466,491 B2
(45) Date of Patent: Nov. 11, 2025

(54) UPPER BODY STRUCTURE FOR VEHICLE BODY

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 493 days.

(21) Appl. No.: 17/881,826

(22) Filed: Aug. 5, 2022

(65) Prior Publication Data
US 2023/0202572 A1 Jun. 29, 2023

(30) Foreign Application Priority Data
Dec. 24, 2021 (KR) .................. 10-2021-0187726

(51) Int. Cl.
*B62D 25/04* (2006.01)
*B62D 25/02* (2006.01)
*B62D 25/06* (2006.01)
*B62D 25/20* (2006.01)

(52) U.S. Cl.
CPC ........... *B62D 25/025* (2013.01); *B62D 25/04* (2013.01); *B62D 25/06* (2013.01); *B62D 25/2009* (2013.01)

(58) Field of Classification Search
CPC ...... B62D 25/025; B62D 25/04; B62D 25/06; B62D 25/2009; B62D 25/2027; B62D 63/025; B62D 33/06; B62D 24/00; B62D 27/023; B62D 25/2036; B62D 25/00; B62D 25/02; B62D 27/02; B60Y 2304/05

USPC ........... 296/187.01, 203.01, 203.02, 209, 29
See application file for complete search history.

(56) References Cited

U.S. PATENT DOCUMENTS

| | | | |
|---|---|---|---|
| 2,007,255 A * | 7/1935 | Rohr .................... | B62D 27/023 296/193.06 |
| 2,733,096 A * | 1/1956 | Waterhouse et al. .. | B62D 23/00 296/202 |
| 4,201,415 A * | 5/1980 | Suchanek .......... | B62D 33/0612 180/68.1 |
| 6,293,618 B1 * | 9/2001 | Sukegawa ............ | B62D 29/008 296/205 |
| 7,644,978 B2 * | 1/2010 | Tosaka .................. | B60N 2/005 296/193.07 |
| 7,828,371 B2 * | 11/2010 | Murakami .............. | E02F 9/166 296/190.07 |
| 8,662,575 B2 * | 3/2014 | Tamura .................. | B62D 25/04 296/209 |
| 9,981,694 B2 * | 5/2018 | Sekiguchi ............ | B62D 21/152 |

(Continued)

FOREIGN PATENT DOCUMENTS

JP H06278659 A * 10/1994

*Primary Examiner* — Joseph D. Pape
(74) *Attorney, Agent, or Firm* — Slater Matsil, LLP

(57) ABSTRACT

An embodiment upper body structure for a vehicle body includes a front body configured to be mounted on a front portion of an under body of the vehicle body, the front body including front side sills respectively disposed at two opposite sides thereof based on a vehicle width direction and center pillars respectively coupled to the front side sills, each of the center pillars including a quadrangular closed cross-section defined by coupling a center pillar outer member and a center pillar inner member and an outer flange portion extending in a forward/rearward direction of the vehicle body.

20 Claims, 14 Drawing Sheets

(56) References Cited

U.S. PATENT DOCUMENTS

2008/0088156 A1\* 4/2008 Sato .................. B62D 25/04
296/203.02
2017/0259854 A1\* 9/2017 Sausaman ............ B62D 65/024
2022/0055697 A1\* 2/2022 Morgans .............. B62D 27/023

\* cited by examiner

UPPER BODY STRUCTURE FOR VEHICLE BODY

CROSS-REFERENCE TO RELATED APPLICATIONS

This application claims the benefit of Korean Patent Application No. 10-2021-0187726, filed on Dec. 24, 2021, which application is hereby incorporated herein by reference.

TECHNICAL FIELD

The present invention relates to a vehicle body.

BACKGROUND

Recently, new mobility visions with new concepts for implementing human-oriented dynamic future cities have been introduced to vehicle industries. One of the future mobility solutions is a purpose-built vehicle (PBV) as a purpose-based mobility vehicle.

The PBV is an environmental-friendly vehicle based on an electric vehicle (EV) for providing various types of customized services to a user. A vehicle body of the PBV includes an under body (also called a rolling chassis or a skateboard in the art) and an upper body assembled to the under body.

In this case, the upper body may have various shapes depending on the type of customized service provided by the PBV. For example, the PBV may be used as a hailing type vehicle having cabins respectively disposed at front and rear sides of the upper body. Further, the PBV may also be used as a cab type vehicle having a cabin only provided at the front side of the upper body.

Therefore, in the related art, costs may increase because the structures of the upper body need to be changed to conform to various types of customized services provided by the PBV.

The above information disclosed in this background section is only for enhancement of understanding of the background of the invention, and therefore it may contain information that does not form the prior art that is already known to a person of ordinary skill in the art.

SUMMARY

The present disclosure relates to a vehicle body. Particular embodiments relate to an upper body structure applied to a vehicle body of a purpose-built vehicle (PBV).

Embodiments of the present invention provide an upper body structure for a vehicle body, which may have a simple configuration and be applied in common to various types of PBVs.

An exemplary embodiment of the present invention provides an upper body structure for a vehicle body, which is assembled to an under body of a vehicle body, the upper body structure including a front body including front side sills respectively disposed at two opposite sides thereof based on a vehicle width direction and center pillars respectively coupled to the front side sills, the front body being mounted on a front portion of the under body, in which the center pillars each include a quadrangular closed cross-section formed by joining a center pillar outer member and a center pillar inner member and an outer flange portion extending in a forward/rearward direction of the vehicle body.

In addition, in the upper body structure for a vehicle body according to an exemplary embodiment of the present invention, the outer flange portion may be connected to an outer surface of the center pillar outer member on the same plane and provided at an outermost side of the center pillar based on the vehicle width direction.

In addition, the upper body structure for a vehicle body according to an exemplary embodiment of the present invention may further include a rear outer panel joined to the outer flange portion of the center pillar.

In addition, in the upper body structure for a vehicle body according to an exemplary embodiment of the present invention, the rear outer panel may include a first joining flange portion extending rearward from an edge portion thereof and joined to the outer flange portion in the vehicle width direction.

In addition, in the upper body structure for a vehicle body according to an exemplary embodiment of the present invention, the front body may further include center bulkheads respectively joined to rear open ends of the front side sills.

In addition, in the upper body structure for a vehicle body according to an exemplary embodiment of the present invention, the center bulkheads may each include a second joining flange portion extending rearward from an edge portion thereof and joined to an inner surface of a side sill outer member of the side sill and an inner surface of the side sill inner member of the side sill.

In addition, in the upper body structure for a vehicle body according to an exemplary embodiment of the present invention, the first joining flange portion and the second joining flange portion may be disposed with an upper portion of a rear end of the side sill inner member interposed therebetween and have the same cross-sections joined to the upper portion of the rear end of the side sill inner member in an upward/downward direction.

In addition, in the upper body structure for a vehicle body according to an exemplary embodiment of the present invention, the front body may further include a front roof rail coupled to upper ends of the center pillar and a front center floor panel coupled to the front side sills.

In addition, in the upper body structure for a vehicle body according to an exemplary embodiment of the present invention, the rear outer panel may be joined to the front roof rail and the front center floor panel in an upward/downward direction by means of the first joining flange portion.

In addition, the upper body structure for a vehicle body according to an exemplary embodiment of the present invention may further include a rear body mounted on a rear portion of the under body and coupled to the front body through the outer flange portions of the center pillars.

In addition, in the upper body structure for a vehicle body according to an exemplary embodiment of the present invention, the rear body may include rear side sills respectively disposed at two opposite sides based on the vehicle width direction, rear pillars respectively coupled to the rear side sills, a rear quarter assembly disposed rearward of the rear pillar and connected to the rear pillar, rear side outer panels coupled to the rear pillars and the rear quarter assembly, a rear roof rail coupled to upper ends of the rear pillars, a rear roof panel coupled to the rear roof rail, and a rear center floor panel coupled to the rear side sills.

In addition, in the upper body structure for a vehicle body according to an exemplary embodiment of the present invention, the front body may include a front roof rail coupled to upper ends of the center pillars, a front roof panel coupled to the front roof rail, and a front center floor panel coupled to the front side sills.

In addition, in the upper body structure for a vehicle body according to an exemplary embodiment of the present invention, the rear roof panel may be joined to the front roof panel in an upward/downward direction.

In addition, in the upper body structure for a vehicle body according to an exemplary embodiment of the present invention, the rear side outer panel may be joined to the outer flange portion of the center pillar in the vehicle width direction.

In addition, in the upper body structure for a vehicle body according to an exemplary embodiment of the present invention, the rear center floor panel may be joined to the front center floor panel in an upward/downward direction.

According to the embodiments of the present invention, the front body may be used in common, and the rear outer panel or the rear body may be selectively assembled to the front body, thereby implementing various types of vehicle bodies of the PBVs.

Therefore, the embodiments of the present invention may reduce costs required to change the upper body structure of the vehicle body to conform to various types of customized services provided by the PBV.

Other effects, which may be obtained or expected by the embodiments of the present invention, will be directly or implicitly disclosed in the detailed description of the embodiments of the present invention. That is, various effects expected according to the embodiments of the present invention will be disclosed in the detailed description to be described below.

BRIEF DESCRIPTION OF THE DRAWINGS

Because the drawings are provided for reference to describe embodiments of the present invention, the technical spirit of the present invention should not be construed as being limited to the accompanying drawings.

Figure 1:
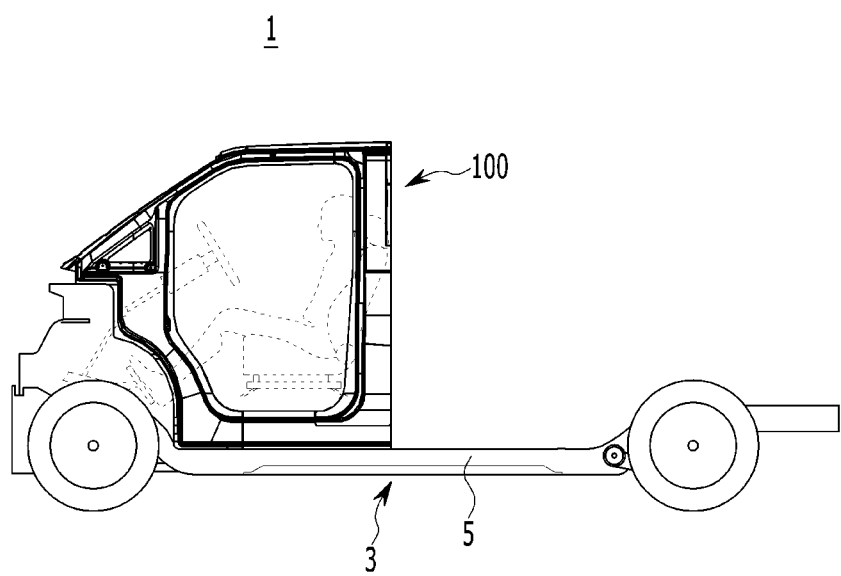
FIG. 1 is a view schematically illustrating a vehicle body of a PBV to which an upper body structure for a vehicle body according to an embodiment of the present invention is applied.

The following reference identifiers may be used in connection with the accompanying drawings to describe exemplary embodiments of the present disclosure.

| | |
|---|---|
| 1: Vehicle body | 3: Underbody |
| 5: Chassis frame | 10: Front body |
| 11: Front side sill | 13: Center pillar |
| 15: Front roof rail | 17: Front center floor panel |
| 18: First floor flange portion | 19: First side sill outer member |
| 21: First side sill inner member | 23: Center pillar outer member |
| 25: Center pillar inner member | 27: Closed cross-section |
| 29: Outer flange portion | 31: Front side outer panel |
| 33: First rail flange portion | 35: Second rail flange portion |
| 37: Front roof panel | 39: First roof flange portion |
| 40: Rear outer panel | 41: First joining flange portion |
| 51: Center bulkhead | 53: Second joining flange portion |
| 70: Rear body | 71: Rear side sill |
| 73: Rear pillar | 75: Rear quarter assembly |
| 77: Rear side outer panel | 79: Rear roof rail |
| 81: Rear roof panel | 83: Rear center floor panel |
| 85: Second side sill outer member | 87: Second side sill inner member |
| 89: Second roof flange portion | 91: Second floor flange portion |
| 100: Upper body structure for vehicle body | |

It should be understood that the accompanying drawings are not necessarily to scale, but provide a somewhat simplified representation of various preferred features that exemplify the basic principles of the present invention. For example, specific design features of the present invention, including particular dimensions, directions, positions, and shapes, will be partially determined by the particularly intended application and use environment.

DETAILED DESCRIPTION OF ILLUSTRATIVE EMBODIMENTS

Hereinafter, embodiments of the present invention will be described in detail with reference to the accompanying drawings so that those with ordinary skill in the art to which the present invention pertains may easily carry out the embodiments. However, the present invention may be implemented in various different ways and is not limited to the embodiments described herein.

The terms used herein are merely for the purpose of describing a specific embodiment and are not intended to limit the present disclosure. The singular expressions used herein are intended to include the plural expressions unless the context clearly dictates otherwise.

It is to be understood that the term "comprise (include)" and/or "comprising (including)" used in the present specification means that the features, the integers, the steps, the operations, the constituent elements, and/or the components are present, but the presence or addition of one or more of other features, integers, steps, operations, constituent elements, components, and/or groups thereof is not excluded. The term "and/or" used herein includes any one or all the combinations of one or more listed related items. In the present specification, the term 'coupled' means a physical relationship between two components which are connected directly to each other or connected indirectly through one or more intermediate components by welding, a self-piercing rivet (SPR), a flow drill screw (FDS), a bonding agent for a structure, or the like.

The terms 'vehicle', 'for a vehicle', and 'automobile' or the similar terms used in the present specification generally include vehicles (passenger automobiles) including passenger vehicles, sport utility vehicles (SUVs), buses, trucks, and various commercially available vehicles and include hybrid vehicles, electric vehicles, hybrid electric vehicles, purpose built vehicles (PBVs) based on electric vehicles, hydrogen power vehicles, and other alternative fuel vehicles (e.g., fuel induced from other resources than petroleum).

Hereinafter, embodiments of the present invention will be described in detail with reference to the accompanying drawings.

FIG. 1 is a view schematically illustrating a vehicle body of a PBV to which an upper body structure for a vehicle body according to an embodiment of the present invention is applied.

Referring to FIG. 1, as an example, an upper body structure 100 for a vehicle body according to an embodiment of the present invention may be applied to a vehicle body 1 of a purpose-built vehicle (hereinafter, referred to as a 'PBV') as a purpose-based mobility vehicle.

The PBV may be an environmental-friendly movable vehicle based on an electric vehicle for providing various types of customized services to a user. As an example, as illustrated in the drawings, the PBV may be a cab type vehicle having a cabin only provided at a front side of the vehicle. As another example, the PBV may be a hailing type vehicle (not illustrated) having cabins respectively provided at front and rear sides of the vehicle.

The vehicle body 1 of the PBV includes an under body 3, and the upper body structure 100 for a vehicle body according to an embodiment of the present invention which is assembled to the under body 3.

The under body 3 (typically also called a rolling chassis or a skateboard chassis in the art) includes a chassis frame 5 on which a battery assembly (not illustrated) may be mounted. Because the structure of the under body 3 is well known in the art, a detailed description thereof will be omitted in the present specification.

In addition, as an example, in the present specification, reference directions for explaining the following components are set as a forward/rearward direction of the vehicle body (e.g., a longitudinal direction of the vehicle body), a vehicle width direction, and an upward/downward direction.

Further, in the present specification, the terms 'upper end portion,' 'upper portion', 'upper end' or 'upper surface' of a component mean an end portion, a portion, an end, or a surface of the component which is disposed at a relative upper side in the drawings, and the terms 'lower end portion,' 'lower portion', 'lower end', or 'lower surface' of a component mean an end portion, a portion, an end, or a surface of the component which is disposed at a relatively lower side in the drawings.

In addition, in the present specification, an end (e.g., one end or the other end) of a component means an end of the component in any one direction, and an end portion (e.g., one end portion or the other end portion) of a component means a predetermined portion of the component that includes the end of the component.

The upper body structure 100 for a vehicle body according to the embodiments of the present invention has a simple configuration and structure that may be applied in common to various types of PBVs.

Figure 2:
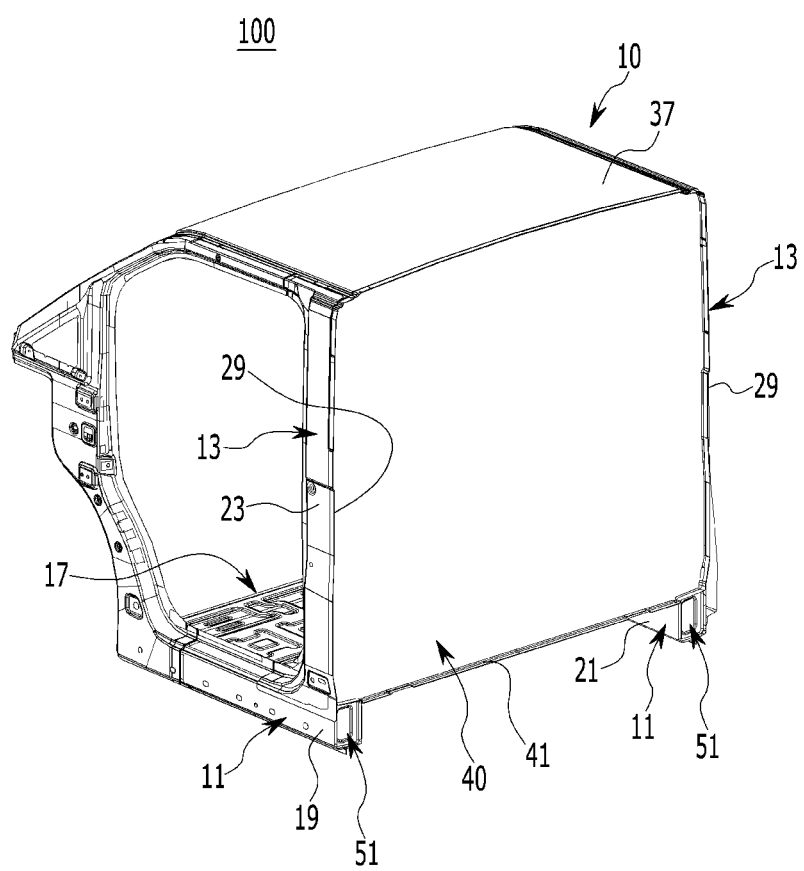
FIG. 2 is a coupled perspective view illustrating the upper body structure for a vehicle body according to an embodiment of the present invention.
Figure 3:
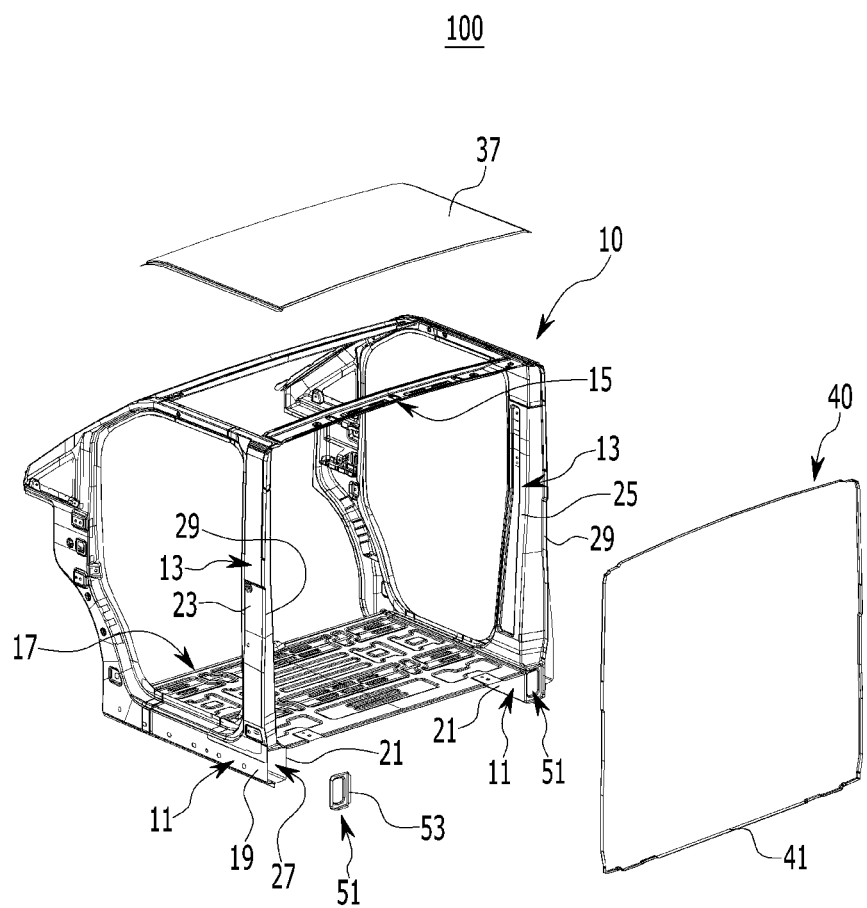
FIG. 3 is a partially exploded perspective view illustrating the upper body structure for a vehicle body according to an embodiment of the present invention.

FIG. 2 is a coupled perspective view illustrating the upper body structure for a vehicle body according to an embodiment of the present invention, and FIG. 3 is a partially exploded perspective view illustrating the upper body structure for a vehicle body according to an embodiment of the present invention.

Referring to FIGS. 1 to 3, the upper body structure 100 for a vehicle body according to an embodiment of the present invention basically includes a front body 10 and a rear outer panel 40.

In an embodiment of the present invention, the front body 10 is mounted on a front portion of the under body 3. As an example, the front body 10 is configured as a cab type having the front cabin and assembled to the front portion of the chassis frame 5 of the under body 3.

In this case, a luggage assembly (not illustrated) may be mounted on a rear portion of the under body 3, and luggage may be loaded onto the luggage assembly.

The front body 10 includes front side sills 11, center pillars 13, a front roof rail 15, a front center floor panel 17, and center bulkheads 51.

In an embodiment of the present invention, the front side sills 11 are respectively disposed at two opposite sides of the front body 10 based on the vehicle width direction.

The front side sills 11 are each opened rearward based on the front body 10 in the forward/rearward direction of the vehicle body. The front side sills 11 each include a first side sill outer member 19 and a first side sill inner member 21 which are joined to each other.

In an embodiment of the present invention, the center pillars 13 are respectively coupled to the front side sills 11 in the upward/downward direction. The center pillars 13 each include a center pillar outer member 23 and a center pillar inner member 25 which are joined to each other.

In this case, the center pillar 13 includes a closed cross-section 27 defined by the center pillar outer member 23 and the center pillar inner member 25 joined to each other. The center pillar 13 includes an outer flange portion 29 extending in the forward/rearward direction of the vehicle body.

Figure 4:
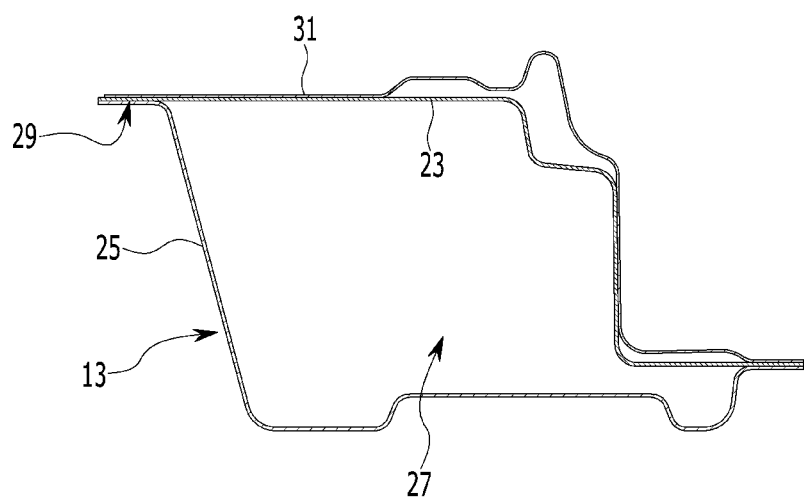
FIG. 4 is a cross-sectional view illustrating a coupling structure of a front side outer panel applied to the upper body structure for a vehicle body according to an embodiment of the present invention.

As an example, as illustrated in FIG. 4, the center pillar outer member 23 and the center pillar inner member 25 of the center pillar 13 may each have an 'L'-shaped cross-section. Therefore, the closed cross-section 27 may have a quadrangular shape formed by joining the center pillar outer member 23 and the center pillar inner member 25.

The outer flange portion 29 may be formed by joining a portion extending from a rear end of the center pillar outer member 23 and a portion extending from a rear end of the center pillar inner member 25.

The outer flange portion 29 is formed at an outer side of the center pillar 13 based on the vehicle width direction. The outer flange portion 29 extends in the forward/rearward direction of the vehicle body from an outer surface of the center pillar 13.

Specifically, the outer flange portion 29 may extend in the forward/rearward direction of the vehicle body from the outer surface of the center pillar 13 without a level difference from the center pillar outer member 23. Therefore, the outer flange portion 29 may be connected to an outer surface of the center pillar outer member 23 on the same plane and provided at an outermost side of the center pillar 13 based on the vehicle width direction.

As illustrated in FIG. 4, a front side outer panel 31 may be joined to the outer surface of the center pillar outer member 23 of the center pillar 13.

In an embodiment of the present invention, the front roof rail 15 is disposed in the vehicle width direction and coupled to upper ends of the center pillar 13.

Figure 5:
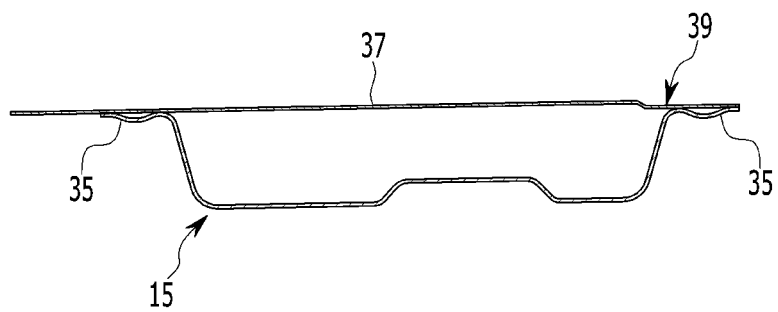
FIG. 5 is a cross-sectional view illustrating a coupling structure between a front roof rail and a front roof panel applied to the upper body structure for a vehicle body according to an embodiment of the present invention.

As illustrated in FIG. 5, the front roof rail 15 may include a first rail flange portion 33 formed at a front side thereof based on the forward/rearward direction of the vehicle body and a second rail flange portion 35 formed at a rear side thereof based on the forward/rearward direction of the vehicle body.

A front roof panel 37 is coupled to the front roof rail 15. The front roof panel 37 is coupled to an upper portion of the front roof rail 15 and joined to the first rail flange portion 33 and the second rail flange portion 35.

Further, the front roof panel 37 includes a first roof flange portion 39 formed at a rear edge portion thereof.

In an embodiment of the present invention, the front center floor panel 17 is coupled to the front side sills 11.

Figure 6:
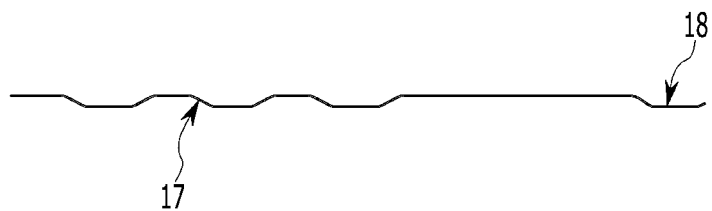
FIG. 6 is a cross-sectional view illustrating a front center floor panel applied to the upper body structure for a vehicle body according to an embodiment of the present invention.

As illustrated in FIG. 6, the front center floor panel 17 includes a first floor flange portion 18 formed at a rear edge portion.

As illustrated in FIGS. 2 and 3, in an embodiment of the present invention, the center bulkheads 51 are provided to close (e.g., seal) the rear open ends of the front side sills 11, respectively, in the forward/rearward direction of the vehicle body.

Further, the center bulkhead 51 serves as a reinforcing member that prevents deformation of the front side sill ii caused by a collision load in the event of a broadside collision of the PBV.

The center bulkheads 51 are respectively joined to the rear open ends of the front side sills 11. The center bulkhead 51 includes a second joining flange portion 53 extending rearward from an edge portion thereof.

Figure 7:
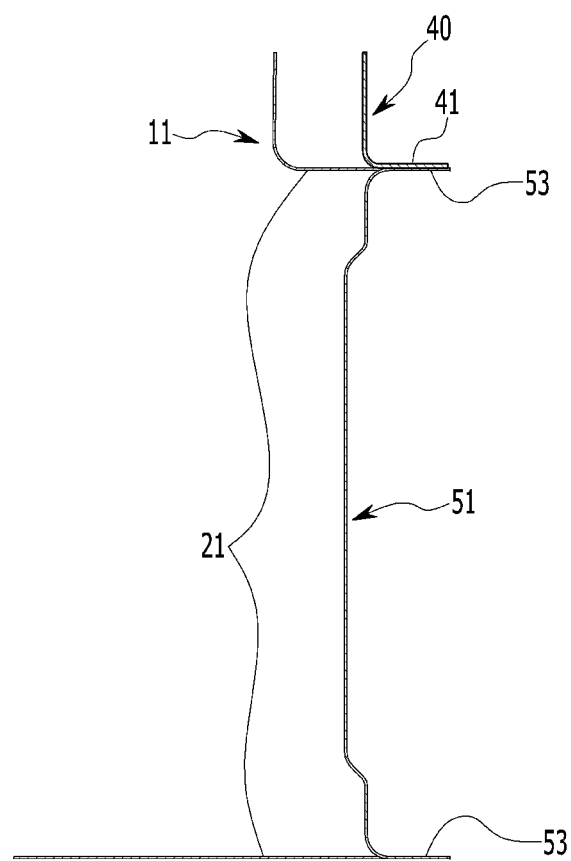
FIG. 7 is a cross-sectional view illustrating a coupling structure of a center bulkhead applied to the upper body structure for a vehicle body according to an embodiment of the present invention.

As illustrated in FIG. 7, the second joining flange portion 53 may be joined to an inner surface of a first side sill outer member 19 (see FIGS. 2 and 3) of the front side sill ii and an inner surface of the first side sill inner member 21.

Further, a first joining flange portion 41 of the rear outer panel 40 and the second joining flange portion 53 of the center bulkhead 51 may have the same cross-section.

In this case, the first joining flange portion 41 and the second joining flange portion 53 are disposed with an upper portion of a rear end of the side sill inner member 21 interposed therebetween and have the same cross-sections joined to the upper portion of the rear end of the side sill inner member 21 in the upward/downward direction.

Referring to FIGS. 2 and 3, in an embodiment of the present invention, the rear outer panel 40 closes the rear opening portion of the front body 10 in the forward/rearward direction of the vehicle body.

The rear outer panel 40 is joined to the rear opening portion of the front body 10 including the outer flange portions 29 of the center pillars 13. As an example, the rear outer panel 40 may be provided in the form of a quadrangular board.

The rear outer panel 40 includes the first joining flange portion 41 extending rearward from an edge portion thereof.

Figure 8:
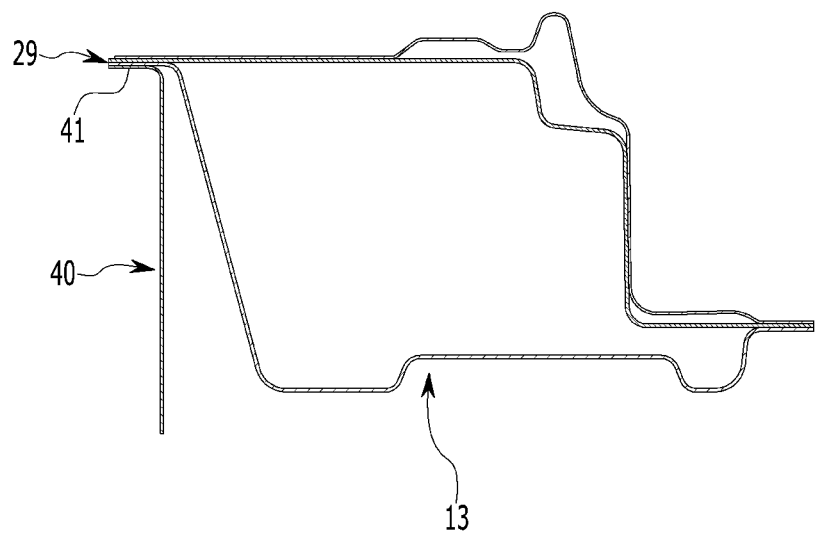
FIGS. 8 and 9 are cross-sectional views illustrating a coupling structure of a rear outer panel applied to the upper body structure for a vehicle body according to an embodiment of the present invention.
Figure 9:
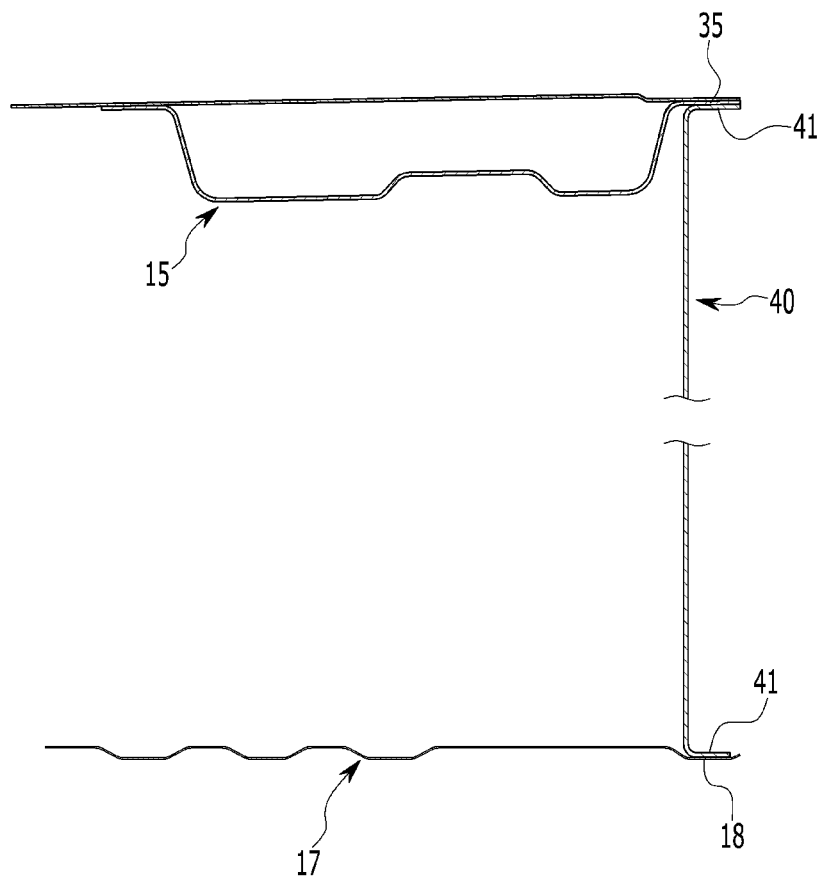

FIGS. 8 and 9 are cross-sectional views illustrating a coupling structure of the rear outer panel applied to the upper body structure for a vehicle body according to an embodiment of the present invention.

Referring to FIG. 8, the rear outer panel 40 may be joined to the outer flange portions 29 of the center pillars 13 in the vehicle width direction by means of the first joining flange portion 41.

In this case, the rear outer panel 40 is joined to the outer flange portions 29 of the center pillars 13, which are provided at the outermost sides based on the vehicle width direction, by means of the first joining flange portion 41, such that the rear outer panel 40 may be coupled to the rear opening portion of the front body 10 without a level difference from the center pillar 13.

Referring to FIG. 9, the rear outer panel 40 may be joined to the second rail flange portion 35 on a lower surface of the front roof rail 15 in the upward/downward direction by means of the first joining flange portion 41.

Further, the rear outer panel 40 may be joined to the first floor flange portion 18 on an upper surface of the front center floor panel 17 in the upward/downward direction by the first joining flange portion 41.

According to the upper body structure 100 for a vehicle body according to the embodiments of the present invention configured as described above, the front body 10 is assembled to the front portion of the under body 3, and the rear outer panel 40 is assembled to the rear portion of the front body 10, such that the PBV may be used as a cab type vehicle.

Figure 10:
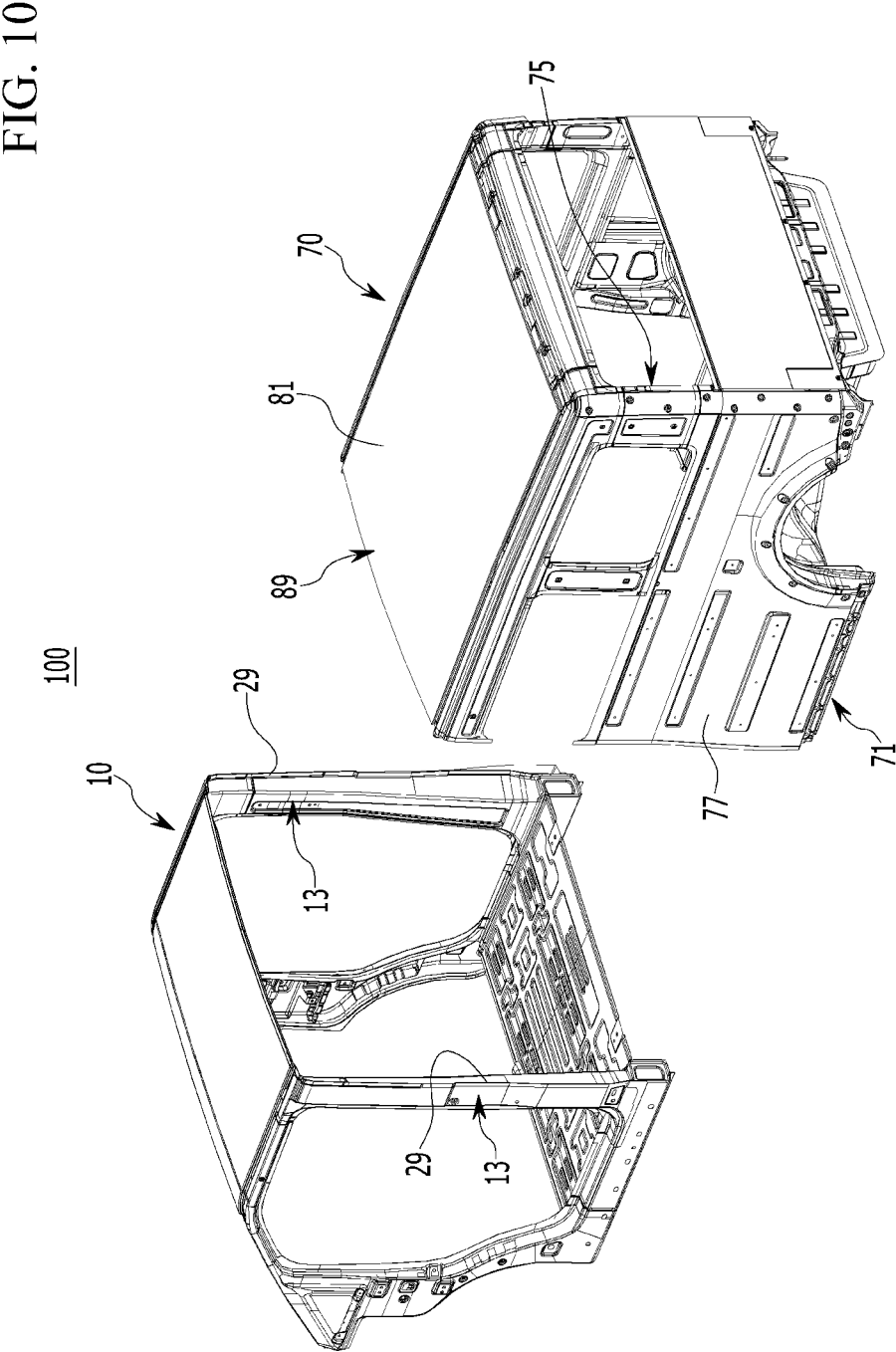
FIGS. 10 and 11 are perspective views illustrating a rear body applied to the upper body structure for a vehicle body according to an embodiment of the present invention.
Figure 11:
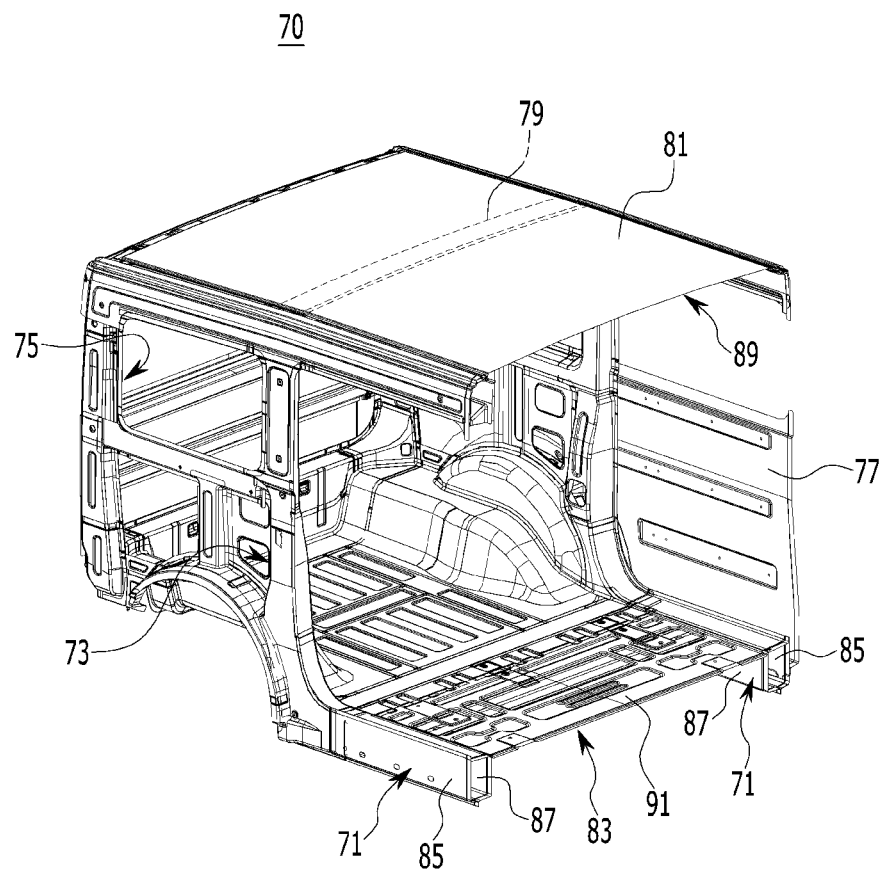

FIGS. 10 and 11 are perspective views illustrating a rear body applied to the upper body structure for a vehicle body according to an embodiment of the present invention.

Referring to FIGS. 10 and 11, the upper body structure 100 for a vehicle body according to an embodiment of the present invention may further include a rear body 70.

In an embodiment of the present invention, the rear body 70 is coupled to the rear portion of the front body 10 from which the rear outer panel 40 (see FIGS. 2 and 3) is eliminated. The rear body 70 may be joined to the rear opening portion of the front body 10 including the outer flange portions 29 of the center pillars 13.

The rear body 70 may be mounted on the rear portion of the under body 3 (see FIG. 1). The rear body 70 may be assembled to the rear portion of the chassis frame 5 (see FIG. 1) of the under body 3 (see FIG. 1). As an example, the rear body 70 may be a box type constituting a rear cabin connected to the front cabin of the front body 10.

The rear body 70 may include rear side sills 71, rear pillars 73, a rear quarter assembly 75, rear side outer panels 77, a rear roof rail 79, a rear roof panel 81, and a rear center floor panel 83.

The rear side sills 71 are respectively disposed at two opposite sides of the rear body 70 based on the vehicle width direction.

The rear side sills 71 are each opened forward based on the rear body 70 in the forward/rearward direction of the vehicle body. The rear side sills 71 each include a second side sill outer member 85 and a second side sill inner member 87 which are joined to each other.

The rear pillars 73 are respectively coupled to the rear side sills 71 in the upward/downward direction. The rear quarter assembly 75 is disposed rearward of the rear pillars 73 and connected to the rear pillars 73.

Figure 12:
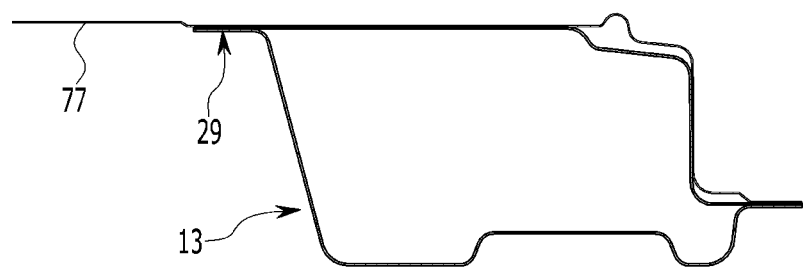
FIG. 12 is a cross-sectional view illustrating a coupling structure of a rear side outer panel of the rear body applied to the upper body structure for a vehicle body according to an embodiment of the present invention.

The rear side outer panels 77 are coupled to outer surfaces of the rear pillars 73 and outer surfaces of the rear quarter assembly 75. As illustrated in FIG. 12, the rear side outer panel 77 may be joined to the outer flange portion 29 on the outer surface of the center pillar 13 of the front body 10 in the vehicle width direction.

In this case, the rear side outer panel 77 is joined to the outer flange portion 29 provided at the outermost side of the center pillar 13 based on the vehicle width direction, such that the rear side outer panel 77 may be joined to the rear opening portion of the front body 10 without a level difference from the center pillar 13.

The rear roof rail 79 is disposed in the vehicle width direction and coupled to upper ends of the rear pillar 73. The rear roof panel 81 is coupled to an upper portion of the rear roof rail 79.

Figure 13:
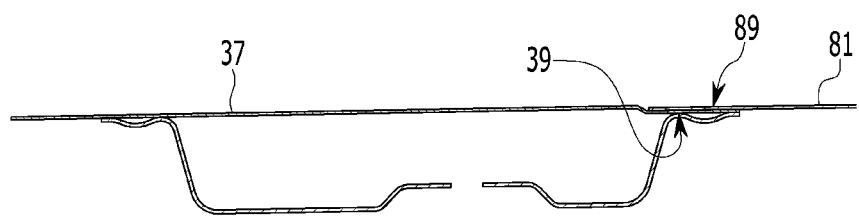
FIG. 13 is a view illustrating a coupling structure of a rear roof panel of the rear body applied to the upper body structure for a vehicle body according to an embodiment of the present invention.

The rear roof panel 81 includes a second roof flange portion 89 formed at a front edge portion thereof. As illustrated in FIG. 13, the rear roof panel 81 may be joined to the first roof flange portion 39 of the front roof panel 37 of the front body 10 by means of the second roof flange portion 89.

Further, the rear center floor panel 83 is coupled to the rear side sills 71.

Figure 14:
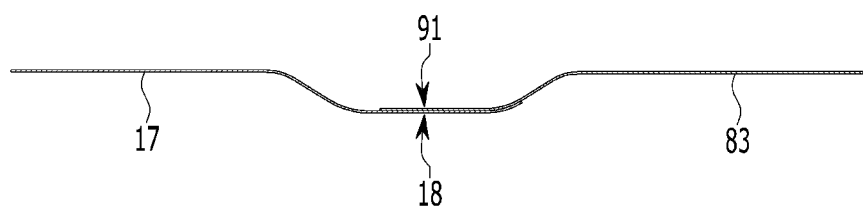
FIG. 14 is a view illustrating a coupling structure of a rear center floor panel of the rear body applied to the upper body structure for a vehicle body according to an embodiment of the present invention.

The rear center floor panel 83 includes a second floor flange portion 91 formed at a front edge portion thereof. As illustrated in FIG. 14, the rear center floor panel 83 may be joined to the first floor flange portion 18 of the front center floor panel 17 of the front body 10 by means of the second floor flange portion 91.

According to the upper body structure 100 for a vehicle body according to the embodiments of the present invention configured as described above, the rear body module 70 coupled to the front body 10 is assembled to the rear portion of the under body 3, such that the PBV may be used as a hailing type vehicle.

According to the upper body structure 100 for a vehicle body according to the embodiments of the present invention described above, the front body 10 may be applied in common to the vehicle body 1 of the PBV, and the rear outer panel 40 or the rear body 70 may be selectively assembled to the front body 10.

Therefore, according to the upper body structure 100 for a vehicle body according to the embodiments of the present invention, the front body 10 may be used in common, thereby implementing various types of vehicle bodies 1 of the PBVs.

As an example, the upper body structure 100 for a vehicle body according to the embodiments of the present invention may allow the PBV to be used as a cab type vehicle and a hailing type vehicle depending on the type of customized service.

Therefore, the embodiments of the present invention may reduce costs required to change the upper body structure 100 of the vehicle body 1 to conform to various types of customized services provided by the PBV.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An upper body structure for a vehicle body, the upper body structure comprising:
   a front body configured to be mounted on a front portion of an under body of the vehicle body, the front body comprising:
   front side sills respectively disposed at two opposite sides of the front body based on a vehicle width direction; and
   center pillars respectively coupled to the front side sills, each of the center pillars comprising:
   a quadrangular closed cross-section defined by coupling a center pillar outer member and a center pillar inner member; and
   an outer flange portion extending in a forward/rearward direction of the vehicle body, wherein the outer flange portion is connected to an outer surface of the center pillar outer member.

2. The upper body structure of claim 1, wherein the outer flange portion is at an outermost side of the center pillar based on the vehicle width direction.

3. The upper body structure of claim 1, further comprising a rear outer panel coupled to the outer flange portions of the center pillars.

4. The upper body structure of claim 3, wherein the rear outer panel comprises a first joining flange portion extending rearward from an edge portion of the rear outer panel and coupled to the outer flange portion in the vehicle width direction.

5. The upper body structure of claim 4, wherein the front body further comprises center bulkheads respectively joined to rear open ends of the front side sills.

6. The upper body structure of claim 5, wherein the center bulkheads each comprise a second joining flange portion extending rearward from an edge portion of each of the center bulkheads and coupled to an inner surface of a side sill outer member of the front side sills and an inner surface of a side sill inner member of the front side sills.

7. The upper body structure of claim 6, wherein the first joining flange portion and the second joining flange portion are disposed with an upper portion of a rear end of the side sill inner member interposed therebetween and have the same cross-sections coupled to the upper portion of the rear end of the side sill inner member in an upward/downward direction.

8. The upper body structure of claim 4, wherein:
   the front body further comprises a front roof rail coupled to upper ends of the center pillars and a front center floor panel coupled to the front side sills; and
   the rear outer panel is coupled to the front roof rail and the front center floor panel in an upward/downward direction by the first joining flange portion.

9. An upper body structure for a vehicle body, the upper body structure comprising:
   a front body configured to be mounted on a front portion of an under body of the vehicle body, the front body comprising:
   front side sills respectively disposed at two opposite sides of the front body thereof based on a vehicle width direction; and
   center pillars respectively coupled to the front side sills, each of the center pillars comprising:
   a quadrangular closed cross-section defined by coupling a center pillar outer member and a center pillar inner member; and
   an outer flange portion extending in a forward/rearward direction of the vehicle body; and
   a rear body configured to be mounted on a rear portion of the under body, the rear body being coupled to the front body by the outer flange portions of the center pillars.

10. The upper body structure of claim 9, wherein the rear body comprises:
    rear side sills respectively disposed at two opposite sides based on the vehicle width direction;
    rear pillars respectively coupled to the rear side sills;

a rear quarter assembly disposed rearward of the rear pillars and coupled to the rear pillars;

rear side outer panels coupled to the rear pillars and the rear quarter assembly;

a rear roof rail coupled to upper ends of the rear pillars;

a rear roof panel coupled to the rear roof rail; and a rear center floor panel coupled to the rear side sills.

11. The upper body structure of claim 10, wherein the front body comprises:

a front roof rail coupled to upper ends of the center pillars;

a front roof panel coupled to the front roof rail; and a front center floor panel coupled to the front side sills.

12. The upper body structure of claim 11, wherein the rear roof panel is coupled to the front roof panel in an upward/downward direction.

13. The upper body structure of claim 11, wherein the rear side outer panels are coupled to the outer flange portions of the center pillars in the vehicle width direction.

14. The upper body structure of claim 11, wherein the rear center floor panel is joined to the front center floor panel in an upward/downward direction.

15. A vehicle body comprising:

an under body;

a front body mounted on a front portion of the under body, the front body comprising:

front side sills respectively disposed at two opposite sides of the front body based on a vehicle width direction; and center pillars respectively coupled to the front side sills, each of the center pillars comprising:

a quadrangular closed cross-section defined by coupling a center pillar outer member and a center pillar inner member; and an outer flange portion extending in a forward/rearward direction of the vehicle body;

a front roof rail coupled to upper ends of the center pillars; and a front center floor panel coupled to the front side sills; and a rear body mounted on a rear portion of the under body and coupled to the front body by the outer flange portions of the center pillars.

16. The vehicle body of claim 15, wherein the outer flange portion is connected to an outer surface of the center pillar outer member and at an outermost side of the center pillar based on the vehicle width direction.

17. The vehicle body of claim 15, wherein the rear body comprises:

rear side sills respectively disposed at two opposite sides based on the vehicle width direction;

rear pillars respectively coupled to the rear side sills;

a rear quarter assembly disposed rearward of the rear pillars and coupled to the rear pillars;

rear side outer panels coupled to the rear pillars and the rear quarter assembly;

a rear roof rail coupled to upper ends of the rear pillars;

a rear roof panel coupled to the rear roof rail; and a rear center floor panel coupled to the rear side sills.

18. The vehicle body of claim 17, wherein the front body comprises a front roof panel coupled to the front roof rail, and wherein the rear roof panel is coupled to the front roof panel in an upward/downward direction.

19. The vehicle body of claim 17, wherein the rear side outer panels are coupled to the outer flange portions of the center pillars in the vehicle width direction.

20. The vehicle body of claim 17, wherein the rear center floor panel is joined to the front center floor panel in an upward/downward direction.

* * * * *

UNITED STATES PATENT AND TRADEMARK OFFICE
CERTIFICATE OF CORRECTION

| | | |
|---|---|---|
| PATENT NO. | : 12,466,491 B2 | Page 1 of 1 |
| APPLICATION NO. | : 17/881826 | |
| DATED | : November 11, 2025 | |
| INVENTOR(S) | : Won Ki Song | |

It is certified that error appears in the above-identified patent and that said Letters Patent is hereby corrected as shown below:

In the Claims

In Column 10, in Claim 9, Line 50, after "front body" delete "thereof".

Signed and Sealed this
Twenty-third Day of December, 2025

John A. Squires
*Director of the United States Patent and Trademark Office*